United States Patent [19]

Clark, Jr.

[11] 4,270,157
[45] May 26, 1981

[54] POWER SUPPLY PROTECTION CIRCUIT

[75] Inventor: Charles A. Clark, Jr., Chatsworth, Calif.

[73] Assignee: RCA Corporation, New York, N.Y.

[21] Appl. No.: 38,079

[22] Filed: May 11, 1979

Related U.S. Application Data

[63] Continuation of Ser. No. 849,399, Nov. 7, 1977, abandoned.

[51] Int. Cl.³ .............................................. H02H 7/04
[52] U.S. Cl. ...................................... 361/35; 315/411; 358/190; 361/1; 361/91
[58] Field of Search .............................. 361/35, 37–40, 361/54–56, 117–119, 1, 2, 170; 323/7–9, 57, 62, 85–89; 328/4, 7, 8, 10, 12; 315/125, 126, 119, 120, 387–389, 411; 340/27 AT, 240, 611, 626, 646, 647, 52 R, 60; 358/190; 325/362; 343/5 R, 6 TV; 363/50, 52, 53, 54

[56] References Cited

U.S. PATENT DOCUMENTS

| | | | |
|---|---|---|---|
| 3,546,536 | 12/1970 | Umin | 361/91 |
| 3,611,002 | 10/1971 | Wedam | 358/190 X |
| 3,745,246 | 7/1973 | Kashiwagi | 358/190 |
| 3,885,201 | 5/1975 | Fernsler | 358/190 X |
| 3,916,288 | 10/1975 | Hicks et al. | 358/190 X |
| 4,041,357 | 8/1977 | Clark, Jr. | 361/56 |
| 4,042,859 | 8/1977 | Kashiwagi | 358/190 X |

FOREIGN PATENT DOCUMENTS

| | | | |
|---|---|---|---|
| 2282732 | 4/1976 | France | 358/190 |
| 1227765 | 4/1971 | United Kingdom | 358/190 |

Primary Examiner—Patrick R. Salce
Attorney, Agent, or Firm—Samuel Cohen; Robert L. Troike; Raymond E. Smiley

[57] ABSTRACT

A power supply which incorporates a feedback network for maintaining an output parameter at a nominal value, includes apparatus, which, upon a change in an environmental parameter provides a signal to the feedback network to alter substantially the output parameter from its nominal value. Such a power supply is useful in a cathode ray tube type display system subject to damaging voltage breakdowns at high altitudes.

7 Claims, 2 Drawing Figures

4,270,157

POWER SUPPLY PROTECTION CIRCUIT

This is a continuation of application Ser. No. 849,399, filed Nov. 7, 1977, now abandoned.

CROSS REFERENCE TO RELATED PATENT APPLICATIONS

Of interest is U.S. patent application, Ser. No. 812,363, filed July 1, 1977, by K. Katagi now U.S. Pat. No. 4,106,021 issued Aug. 8, 1978, assigned to the same assignee as the present application.

BACKGROUND OF THE INVENTION

Circuits operating at high voltage are typically subject to voltage breakdown at higher elevations (lower atmospheric pressure conditions). Such voltage breakdown, manifested as an arc, is often harmful to the equipment involved. One solution to the problem is to use sufficiently high quality components so that either breakdown does not occur at altitudes of interest or that such a breakdown causes no harm. In some situations, equipment need not operate at higher altitudes, but need only remain undamaged so that it will be operational when the equipment is once again at lower altitudes.

An airborne weather radar is an example of such equipment. Specifications require that it must operate at relatively lower altitudes after being on, but not necessarily operational, at higher altitudes. It has become common to utilize ordinary television receiver circuits as the display portion of the radar. A television receiver contains a high voltage power supply which typically produces damaging voltages at higher altitudes (low pressure). U.S. Pat. No. 4,041,357, issued Aug. 9, 1977, to the instant inventor and assigned to the common assignee describes a power supply circuit in which a pressure sensitive switch operates to shunt voltage produced by the high voltage power supply thereby reducing its output voltage to safe levels. Such a system requires that certain parts of the high voltage power supply, for example, the power transformer, be accessible to effect the shunting arrangement. When such parts are not accessible, another protection circuit must be utilized.

Changes in environmental parameters additional to or instead of low pressure may also cause power supply damage if the power supply continues to operate at its normal output conditions. Thus, for example, power supply arcing may occur under conditions of high humidity. A power supply or other associated circuits may also be damaged by elevated temperatures.

SUMMARY OF THE INVENTION

A power supply includes feedback means to maintain an output parameter of the power supply at nominal value. A means is responsive to an environmental parameter exceeding a preselected value for producing a command signal. Means coupled to the feedback means is responsive to the command signal for supplying a signal to the feedback means for altering the output parameter from its nominal value.

DETAILED DESCRIPTION OF A PREFERRED EMBODIMENT

Figures 1, 2:
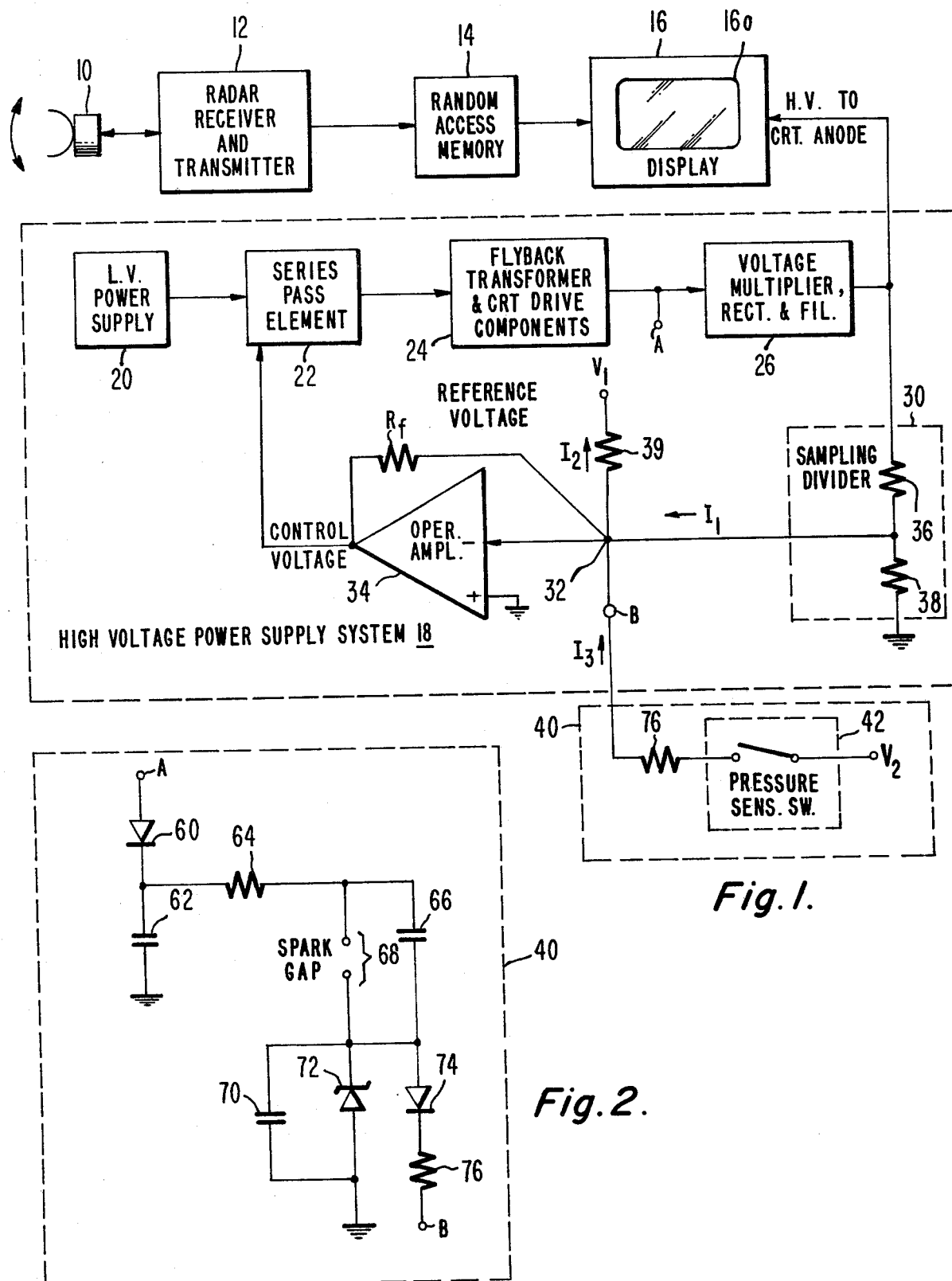
FIG. 1 is a block schematic of an airborne weather radar system incorporating the present invention.
FIG. 2 is an alternate embodiment of an altitude sensitive circuit in accordance with the present invention.

In FIG. 1 an airborne radar system is illustrated which comprises a pivotal antenna 10, radar receiver and transmitter 12, memory 14, and a cathode ray tube type display system 16. Antenna 10, of conventional design, under control of radar receiver and transmitter 12, pivots back and forth through a predetermined arc. At each of a plurality of angular positions within the predetermined arc, antenna 10 transmits radar pulses at a suitable frequency and receiver signals which, as a function of time, are indicative of meteorological conditions at different distances from antenna 10.

Signals received at antenna 10 are processed in radar receiver and transmitter 12 in a conventional manner. Receiver and transmitter 12 may be any of a number of commercially available devices. One such exemplary device is the PriMUS model 400 radar made by the RCA Corporation, 8500 Balboa Blvd. Van Nuys, Calif. The signals processed by receiver and transmitter 12, are digitized into a bit stream as described, for example, in the aforementioned U.S. patent application, Ser. No. 812,363, filed July 1, 1977, by K. Katagi (now U.S. Pat. No. 4,106,021). The digitized signals are stored in a suitable digital random access memory 14 to which radar receiver and transmitter 12 is coupled. Random access memory 14 is coupled to a display 16 which displays information from memory 14 in a raster scan format on cathode ray tube (CRT) 16a. Display 16 contains various circuits found in the typical home television receiver for such functions as CRT beam deflection. As described in the aforementioned, U.S. patent application, Ser. No. 812,363, display 16 also contains proper circuitry for addressing memory 14 in a predetermined manner to cause a proper display to appear on CRT 16a. Display 16 also contains an appropriate digital-to-analog converter to convert the digital signals from memory 14 into the analog signals which are applied to CRT 16a. Memory 14 functions as a buffer between the input signals from radar receiver transmitter 12 which occur at a relatively slow rate and signals to display 16 which are required at a fast rate to provide a frame refresh at the rate of 30 times a second.

As is typical of television type display devices, display 16 also contains the CRT high voltage power supply elements. For purposes of description, high voltage power supply 18 is shown exterior to display 16. High voltage power supply 18 includes a source of direct current low voltage power 20, a series "pass" element 22, flyback transformer and related drive components 24, producing a pulsed output signal at terminal A, and a voltage multiplier, rectifier and filter subassembly 26 for producing a direct current bias voltage. All of these items (with the exception of element 22) are conventional in a typical television receiver and in particular are the type used in the Sony Model KV-5100 color television receiver. Series "pass" element 22 may typically be a transistor with its collector coupled to power supply 20, with its emitter coupled to flyback transformer 24 and with its base coupled to operational amplifier 34. For greater power supply regulation, than is common in a conventional television receiver, the high voltage power supply system of FIG. 1 includes a feedback network comprising a sampling divider 30, a summing node 32, and an operational amplifier 34.

Summing node 32 is a short circuit which is connected directly to the negative input terminal of operational amplifier 34 as is feedback resistor $R_f$. The positive terminal of amplifier 34 is connected to earth ground. Therefore in accordance with well known principles of operation an operational amplifier having a feedback connection, such as through $R_f$, node 32 is at virtual ground. Summing node 32 algebraically sums currents applied thereto and draws (in a positive or negative sense) current from $R_f$ to balance the summed currents. The voltage required to provide the balancing current passing through resistor $R_f$ is produced at the output terminal of amplifier 34 and applied to the control (base) terminal of element 22. Node 32 has coupled to it as one input a resistor 39 which has applied to it a bias voltage $V_1$.

Sampling divider 30 comprises series resistors 36 and 38 connected between the output of voltage multiplier circuit 26 and a suitable reference source such as earth ground. The junction of resistors 36 and 38 in sampling divider 30 is coupled to one input of summing node 32. In accordance with Thevenin's Theorem the equivalent resistance connected to node 32 from sampling divider 30 is the value of the parallel combination of resistors 36 and 38 while the voltage applied to the equivalent resistance is the value of the voltage produced by voltage multiplier 26 times the ratio of the value of resistor 38 to the sum of the value of resistors 36 and 38.

Typically voltage multiplier 26 produces a D.C. signal in the order of 13,000 volts, while sampling divider 30 reduces this by a factor of approximately 2,000 to some value in the order of 6 volts providing an appropriate current $I_1$ to summing node 32. The reference voltage $V_1$ and resistor 39 are chosen to be of values such as to supply current $I_2$ to node 32 which is the same current as that supplied by sampling divider 30 when multiplier 26 is producing the desired nominal value (but of opposite polarity).

In the event the voltage produced by power supply voltage multiplier 26 is too high or too low, a net current above or below zero (proportional to the over voltage or under voltage) will appear at summing node 32. This net current is applied to an operational amplifier 34, the output terminal of which is coupled to the control terminal (base terminal) of a series pass element 22 to thereby alter the power supply voltage up or down as required for generation of the proper voltage at voltage multiplier circuit 26. The circuit and function described hereinbefore is conventional in controllable power supplies employing feedback systems.

As mentioned in the Background section, at relatively high elevations, say in the order of 9,000 meters above sea level, the voltage normally produced by voltage multiplier 26 begins to cause arcing among the various components of display 16. As an example, in the above-mentioned Sony receiver, arcing has been observed to occur between the high voltage lead to the anode of the cathode ray tube and the tube itself at atmospheric pressures associated with an altitude of 10,500 meters. In other television receivers, arcing has been observed to occur between the output terminal of flyback transformer 24 and chassis and between the output terminal of voltage multiplier 26 and chassis. To prevent damage due to arcing, it is desirable that the output voltage of voltage multiplier 26 be substantially reduced from its desired nominal value. In accordance with the present invention, the output voltage of voltage multiplier 26 is reduced substantially by means 40 responsive to an environmental parameter (e.g., pressure, humidity or temperature) exceeding a preselected value for providing a command signal. In particular, in block 40 a suitable bias voltage $V_2$ is coupled to one terminal of a normally open pressure (altitude) sensitive switch 42. The second terminal of pressure sensitive switch 42 is coupled via resistor 76 to a third terminal, B, of summing node 32 providing current $I_3$ thereto.

Operation of the high voltage power supply 18 of FIG. 1 is as follows. At relatively lower elevations, typically less than 9,000 meters, voltage multiplier circuit 26 produces a high voltage at some predetermined value which is applied to the anode terminal of cathode ray tube 16a. Current $I_1$ corresponding to a fraction, much less than one, of the high voltage is applied to summing node 32 which, when voltage multiplier circuit 26 is generating the proper voltage, is identical to current $I_2$. If the voltage from voltage multiplier 26 becomes undesirably elevated, a positive error signal is applied to operational amplifier 34 which, in turn, provides an amplified error signal to series pass element 22 causing the voltage from voltage multiplier 26 to be reduced until such a point that a negligible error signal is provided by summing node 32 to operational amplifier 34. Similarly, if the output voltage of voltage multiplier 26 drops below the desired value, current $I_1$ applied to summing node 32 will be less than current $I_2$ and a negative error signal will be applied to operational amplifier 34. The resulting output signal from amplifier 34 is applied to series pass element 22 which, in response thereto, causes an increase in the voltage produced at voltage multiplier 26.

When the system of FIG. 1 is subject to decreases in pressure to a predetermined value at which the voltage produced by voltage multiplier 26 could cause arcing, pressure sensitive switch 42 responding to the predetermined value of pressure is caused to close. Switch 42, when closed, causes current $I_3$ to be applied to summing node 32. Since, under normal operating conditions, desirably current $I_2$ = current $I_1$, the addition of positive current $I_3$ causes a positive error signal to be produced by summing node 32. This positive error signal is applied to amplifier 34, resulting in a substantially reduced voltage from voltage multiplier 26 to a value such that the current supplied by sampling divider 30 when added to current supplied at terminal B is just equal to current $I_2$.

By way of example, reference voltage $V_1$ is typically 6.2 volts, while bias voltage $V_2$ is typically 12 volts. Thus, for the sum of current $I_3$ determined by bias voltage $V_2$ and resistor 76 and the current $I_1$ determined by the sample voltage from sampling divider 30 to equal the current $I_2$ determined by reference voltage $V_1$, and resistor 39, a reduction of 50 percent is achieved at voltage multiplier 26, which is sufficiently low to prevent arcing.

When the pressure of the system of FIG. 1 is raised above that at which damaging arcing occurs, pressure sensitive switch 42 responds to the increase in pressure by opening, thereby removing current $I_3$ from summing node 32. This creates a large negative error signal which causes a voltage multiplier 26 to increase its voltage output once again to its nominal value.

In some applications, it is desirable to avoid the use of mechanical devices such as mechanical pressure sensitive switches 42. The circuit of FIG. 2 to which attention is now directed, accomplishes the same result as those elements contained in block 40, FIG. 1. Output terminal A of flyback transformer 24 is coupled to the anode of a rectifying device 60. The cathode of rectifier 60 is coupled to a charge storage capacitor 62 and to a resistor 64. Resistor 64 is, in turn, coupled to a noise suppression capacitor 66 and to one terminal of a spark gap 68. The remaining terminals of spark gap 68 and capacitor 66 are coupled together and are additionally coupled to a capacitor 70, a reference means such as a Zener diode 72 and to the anode of rectifier 74. The remaining terminals of capacitor 70 and reference means 72 are coupled to the suitable source of reference potential such as earth ground (the same ground to which resistor 38, FIG. 1, is coupled). The cathode of rectifier 74 is coupled via resistor 76 to terminal B of summing node 32 (FIG. 1). The general operation of spark gap 68 in the circuit illustrated is described in U.S. Pat. No. 4,041,357, issued Aug. 9, 1977, to the instant inventor. Operation of the circuit of FIG. 2 is as follows:

The signal produced at terminal A (FIG. 1) which is a pulsed signal having a peak value of approximately 4 kilovolts is rectified by rectifier 60 and applied to capacitor C1 which becomes charged to the full peak voltage, e.g., 4,000 volts. Substantially, the same D.C. level is also developed across capacitor 66 due to leakage through capacitor 70 and Zener diode 72. Due to the relative values of capacitors 66 and 70, (in one embodiment the value of capacitor 70 is approximately 10,000 times the value of capacitor 66) insufficient voltage is developed across capacitor 70 to forward bias Zener diode 72. Therefore, essentially zero voltage appears at the anode of rectifier 74 and zero current appears at terminal B, so that the circuit of FIG. 1 operates as though the elements in circuit 40 are not present.

However, above some predetermined altitude, such as for example, 9,000 meters, arcing begins to occur across spark gap 68 causing it to act like a short circuit. Arcing energy at spark gap 68 is provided by the charge on capacitor C2 which places C2 at approximately 4,000 volts. With spark gap 68 acting as a short circuit, current begins to flow both from terminal A through rectifier 60 and from capacitor 61 through resistor 64 and across gap 68 to charge capacitor 70 to a higher level. Zener diode 72 clamps the voltage across capacitor 70 to a safe level (such as, for example, 12 volts). The voltage (energy) from capacitor 70 is discharged through rectifier 74 providing current through resistor 76 to the high voltage power supply feedback loop at terminal B of summing node 32 (FIG. 1), producing the same results as described in connection with the operation of FIG. 1.

With current $I_3$ supplied from circuit 40 to summing node 32, the voltage at terminal A drops to approximately a half of its previous value. When this occurs, the voltage applied to spark gap 68 is also reduced causing the arc to extinguish. Because energy is being stored in capacitor 70, current $I_3$ applied to summing node 32 continues to be applied until capacitor 70 discharges slightly resulting in a reduced current $I_3$ at terminal B and therefore an increased voltage at terminal A. As the high voltage at terminal A, and therefore the voltage across spark gap 68 begin to rise, the spark gap again begins to fire to recharge capacitor 70. The amount of high voltage output rise at terminal A between gap firings is a function of loop gain of the loop comprising elements 34, 22, 24, 26, and 30 and the relative values of resistors 64 and 76 and capacitors 62 and 70. Capacitor 66 makes the gap less noise sensitive and thus reduces hysteresis in the gap firing voltage. When the altitude of the system of FIG. 1 is reduced below the preselected value (e.g., 9,000 meters), the arcing across spark gap 68 ceases and the radar system returns to normal operation once again.

It will be understood that the invention is applicable to power supply circuits other than those for use in airborne weather radar and is applicable to those situations in which it is desired to change the supply output voltage due to a change in environmental parameters other than pressure to the feedback network. For example, temperature or humidity or a number of other parameters could cause the triggering action. In such a case, an appropriate switch will be substituted for the pressure sensitive switch 42, FIG. 1 or the alternative solid state version pressure sensitive switch as illustrated in FIG. 2. It will be further understood that output parameters other than voltage may be controlled in a similar manner. Thus an appropriate power supply which produces some desired current may have its current output altered in response to a change in some parameter of the system.

A combination of environmental parameters could be utilized as criteria for altering the output of a power supply. Thus, for example, a switch sensitive to humidity could be placed in parallel with switch 42 so that either pressure or humidity exceeding some preselected limits could cause reduced power output from power supply 18. Alternatively, a switch sensitive to humidity could be placed in series with switch 42 so that both a change in pressure and humidity beyond preselected limits would be required to alter the output of power supply 18.

What is claimed is:

1. In combination:
   a power supply having an output signal and being of the type which includes feedback means to maintain said output signal at a preselected value;
   means responsive to an environmental parameter attaining a preselected value for providing a command signal; and
   means coupled to said feedback means and responsive to said command signal for providing to said feedback means a signal for altering said output signal from said preselected value so long as said command signal is present;
   said feedback means including a summing node and means to apply to said summing node:
   a. a signal of one polarity and of magnitude corresponding to the value of said output signal;
   b. a reference signal of polarity opposite that of said one polarity and of magnitude equal to that of said signal of one polarity when said output signal is at said preselected value; and
   c. said altering signal having the same polarity as said first signal.

2. The combination as set forth in claim 1 wherein said power supply includes means providing an output voltage having an output value which produces arcing when said environmental parameter attains a value beyond said preselected value.

3. The combination as set forth in claim 2 wherein said environmental parameter is atmospheric pressure and wherein means providing said command signal includes a spark gap comprised of two spaced anodes responsive to said voltage from said power supply and responsive to a change in atmospheric pressure beyond said preselected value for producing a spark across said anodes to thereby provide said command signal.

4. The combination as set forth in claim 1 wherein said environmental parameter is atmospheric pressure and wherein said means providing said command signal includes mechanical means for measuring changes in atmospheric pressure.

5. The combination as set forth in claim 2 further including a display device coupled to said power supply to receive said output signal therefrom.

6. In a display system which includes a high voltage power supply means including feedback means for providing an output signal at a preselected value which value causes electrical arcing within the display system when subject to atmospheric pressure without a given range of values, the improvement comprising:
   means responsive to said atmospheric pressure being without said given range for producing a command signal; and
   means responsive to said command signal for providing a control signal to said feedback means of value such as to cause the value of said power supply means output signal to decrease below a value which causes arcing so long as said atmospheric pressure is without said given range of values;
   said feedback means including a summing node and means to apply to said summing node:
   a. a signal of one polarity and of magnitude corresponding to the value of said output signal;
   b. a reference signal of polarity opposite that of said one polarity and of magnitude equal to that of said signal of one polarity when said output signal is at said preselected value; and
   c. said control signal having the same polarity as said first signal.

7. The combination as set forth in claim 6 wherein said means providing a command signal comprises means responsive to the value of the atmospheric pressure, to which said system is subject, being below said given range, for producing said command signal.

* * * * *